US008340972B2

(12) United States Patent
Boillot et al.

(10) Patent No.: US 8,340,972 B2
(45) Date of Patent: Dec. 25, 2012

(54) PSYCHOACOUSTIC METHOD AND SYSTEM TO IMPOSE A PREFERRED TALKING RATE THROUGH AUDITORY FEEDBACK RATE ADJUSTMENT

(75) Inventors: Marc Andre Boillot, Plantation, FL (US); John Gregory Harris, Gainesville, FL (US); Thomas Lawrence Reinke, Fairbom, OH (US)

(73) Assignee: Motorola Mobility LLC, Libertyville, IL (US)

( * ) Notice: Subject to any disclaimer, the term of this patent is extended or adjusted under 35 U.S.C. 154(b) by 2337 days.

(21) Appl. No.: 10/607,760

(22) Filed: Jun. 27, 2003

(65) Prior Publication Data

US 2004/0267524 A1 Dec. 30, 2004

(51) Int. Cl.
*G10L 21/06* (2006.01)
*G10L 19/14* (2006.01)
*H04M 11/00* (2006.01)

(52) U.S. Cl. ........ 704/271; 704/211; 704/258; 704/267; 704/270; 379/52

(58) Field of Classification Search .................. 704/211, 704/216, 258, 267, 271, 503; 379/52
See application file for complete search history.

(56) References Cited

U.S. PATENT DOCUMENTS 4,550,425 A * 10/1985 Andersen et al. ............. 704/212
5,175,769 A 12/1992 Hejna, Jr. et al.
5,611,002 A 3/1997 Vogten et al.
5,630,013 A 5/1997 Suzuki et al.
5,694,521 A * 12/1997 Shlomot et al. ............... 704/262
5,717,818 A * 2/1998 Nejime et al. ................ 704/211
5,717,823 A * 2/1998 Kleijn ........................... 704/220
5,806,023 A 9/1998 Satyamurti
5,828,995 A * 10/1998 Satyamurti et al. .......... 358/1.18
5,842,172 A 11/1998 Wilson
5,893,062 A 4/1999 Bhadkamkar et al.
5,920,840 A 7/1999 Satyamurti et al.
6,173,255 B1 1/2001 Wilson et al.
6,278,387 B1 8/2001 Rayskiy
6,718,309 B1 * 4/2004 Selly ............................. 704/503
2002/0038209 A1 * 3/2002 Brandel et al. ................ 704/207
2002/0052967 A1 5/2002 Goldhor et al.
2004/0179676 A1 * 9/2004 Okuda et al. ............. 379/399.01

FOREIGN PATENT DOCUMENTS

WO WO 01/74040 10/2001
WO WO 02/09090 1/2002

OTHER PUBLICATIONS

Nejime et al. "A Portable Digital Speech-Rate Converter for Hearing Impairment". IEEE Trans Rehabil Eng. 1996, pp. 73-83.*

* cited by examiner

*Primary Examiner* — James Wozniak

(57) ABSTRACT

The use of SOLA speech time compression/expansion in the present invention method as a means to alter a speaker's talking rate by adjusting the speech rate at which people hear their own voice. A person speaks at a certain comfort rate, which is established and maintained by their own auditory system's capability to hear their own voice as they speak i.e., it is a self-auditory feedback mechanism. Changing the rate (112) at which a talker hears their own voice (130, 2012, 2024) will accordingly change their talking rate. This effect is achieved in this invention by employing a real time processing method (110, 402-416, FIG. 10) that temporarily adjusts the speech rate in an effort to impose this psychoacoustic condition which coerces the speaker into changing their talking rate. This invention permits users to adjust the comfort rate at which they normally speak (124) or to adjust the rate at which others speak to them through the use of a speech processing device or system.

22 Claims, 10 Drawing Sheets

```
%--------------------------------------------
% TEMPLATE FOR ASSEMBLY CODING
%
% Implement temporal compression sola algorithm straight up
% It simply processes frame by on a real time basis
%
% CALLS SOLA 0
%--------------------------------------------

clear
path(path,'d;\sola\asm_sola3');
x=hexreadib('scott1.io',0);


global y oldwin;
global winlen winstep cc_range;
global runindex1 runindex2;
global cc_valsI cc_vals2

Nframes=13;
compress=0;

  % convert time of window length to number of samples winlen = 180;

    if(compress)
    winstep=winlen;
    nwins=Nframes;
    cc_range=winlen/2;   %conpression
    else
    winstep=winlen/2;
   nwins=2*Nframes;
     cc_range=winstep/2;   %expansion (==winlen/4)
    end
  % compute total munber of windows in input vector

  % cc_range is used to set cross-correlation detection range

 oldwin=x(1:winlen);
 y=oldwin;
 runindex1=1;
 runindex2=winlen;

 for i=2:nwins
  begin=(i-1)*winstep+1;
  frame=x(begin; begin+wilen-1);
  y=sola(frame);
 end
```

*FIG. 18*

```
%-------------------------------------------
%
% This is an implementation of the synchronized overlap and ad method (SOLA)
% for time scale compression
%
% SPECIFICALLY FOR USE AS A REAL TIME APP WHICH ACCEPTS 1 FRAME PER
% X-should be one frame of speech only
% Y-storage be one frame of speech only
% cf-compression factor
%
%-------------------------------------------

function [y]=sola(newwin)

global y;
global winlen winstep cc_range;
global runindex1 runindex2;
global cc_vals1 cc_vals2

  % compute the cross-corelation
  the_corr=xcorr(oldwin, newwin);

  [maxcc,indx]= max(the_corr(:cc_range));

  runindex2=winlen+runindex1 -1;  %always end of old frame

  runindex1=runindex2-indx+1;
  grad=[1indx]'/(indx+1);

  % sola region
  y(runindex1:runindex2)=y(runindex1;runindex2).*flipud(grad)...
  +newwin(:indx).*grad;

  % append remainder of new frame
  :runindex1+winlen-1=newwin((indx+1):winlen);
  oldwin=y(runindex1:runindex]+winlen-1);
```

*FIG. 19*

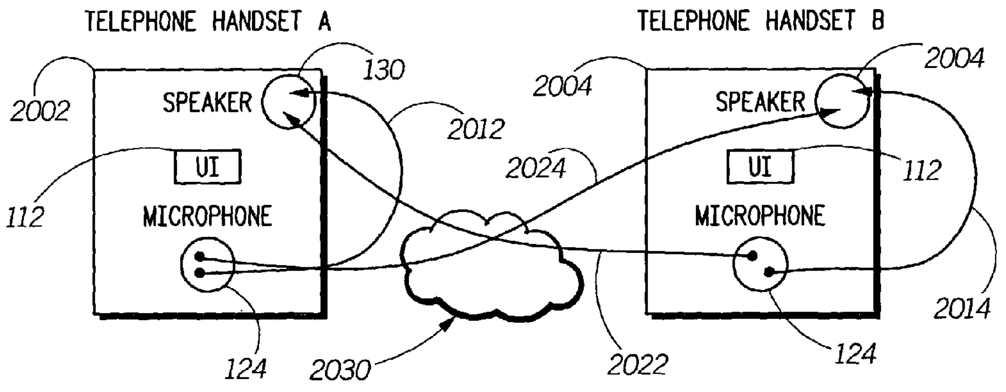

*FIG. 20*

PSYCHOACOUSTIC METHOD AND SYSTEM TO IMPOSE A PREFERRED TALKING RATE THROUGH AUDITORY FEEDBACK RATE ADJUSTMENT

CROSS REFERENCE TO RELATED APPLICATIONS

This application is related to application serial number [pending], which is filed concurrently herewith, entitled "Synchronization And Overlap Method And System For Single Buffer Speech Compression And Expansion," which is commonly assigned herewith to Motorola, Inc., and which is hereby incorporated by reference in its entirety.

FIELD OF THE INVENTION

The present invention generally relates to the field of telephony handsets, and more particularly relates to digital audio devices, such as telephony handsets and digital tape recorders, for adjusting the audio listening rates.

BACKGROUND OF THE INVENTION

A psychoacoustic principle of hearing and speech production is that an individual has a certain comfort rate at which they speak. This rate is also mediated by their own auditory system, i.e., a person talking hears themselves talking both internally and through their speech entering their ears. It is known in speech communication research that a talking individual establishes a speaking rate based on the hearing of his or her own speech which conforms to this internal comfort speaking rate. By adjusting the feedback speech rate between what the speaker is saying and what the speaker hears himself saying, it is possible to psychologically coerce the speaker to change their speaking rate. In effect, if language communicated by a speaker is slowed down and played back through headphones or a loudspeaker device to the speaker while the speaker is talking, the speaker will slow down his speaking rate in an attempt to maintain the speaking rate they are hearing. This is the result of a self-correcting mechanism in the motor language model of speech production, which balances the rate at which speech is spoken to the rate at which that speech is heard internally. The motor language model describes speech production as the coordination of muscular actions in the respiratory, laryngeal, and vocal tract systems. It is a feedback mechanism, which attempts to minimize the speaking rate difference between what is heard and what is being spoken. Motor control is described as the planning and coordination of muscle movements of the articulatory gestures in speech production from sensory feedback.

The Lombard effect in speech describes how people change their speech in noisy surroundings with the most obvious change to simply speak louder. The Lombard effect is one example of self-auditory feedback, which psychologically encourages a talker to speak louder than the level of the surrounding sounds they are hearing. The talker places emphasis on certain sections of the words to improve the discernibility and hence intelligibility of the speech. Consider when you speak to someone at a concert; you "pronounce" words differently. Many algorithms have tried to capture this behavior to improve the intelligibility of reproduced speech in voice communication systems. None have been able to do so yet. The psychological effect of hearing background noise while speaking is a feedback mechanism, which typically compels a person speaking to speak with different articulation.

Similarly, there are speech/hearing devices in which speech is captured through a microphone and played back to the talker while they are talking. These are seen on sports newscasts where a hearing device lets the talker hear what they are saying. Additionally, this principal has been used intentionally with a delay in the hearing device playback for people with stuttering disabilities. Studies have shown that speech played back to a stuttering talker while they are talking can lessen the number of their stutters. The psychological feedback mechanism with the delay allows them to hear themselves just prior to formulation of the articulator gestures. This additional delay smoothes their speaking.

Therefore a need exists to overcome the problems with the prior art as discussed above.

SUMMARY OF THE INVENTION

The use of SOLA speech time compression/expansion in the present invention method as a means to alter a speaker's talking rate by adjusting the speech rate at which people hear their own voice. A person speaks at a certain comfort rate, which is established and maintained by their own auditory system's capability to hear their own voice as they speak i.e., it is a self-auditory feedback mechanism. Changing the rate at which a talker hears their own voice will accordingly change their talking rate. This effect is achieved in this invention by employing a real time processing method that temporarily adjusts the speech rate in an effort to impose this psychoacoustic condition which coerces the speaker into changing their talking rate. This invention permits users to adjust the comfort rate at which they normally speak or to adjust the rate at which others speak to them through the use of a speech processing device or system.

BRIEF DESCRIPTION OF THE DRAWINGS

FIGS. 18 and 19 are high-level MATLAB code for caring out the SOLA operations, according to the present invention.

FIG. 20 is a block diagram of an embodiment illustrating how loopback combined with SOLA processing is used to adjust speech rate, according to the present invention.

DETAILED DESCRIPTION

Figure 1:
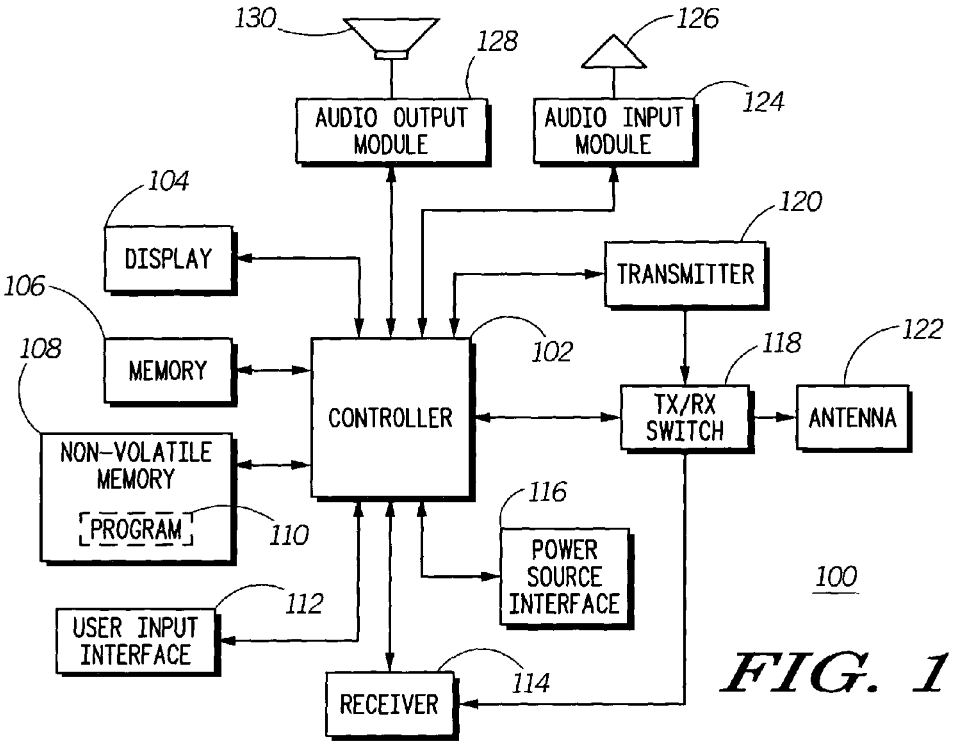
FIG. 1 is a block diagram of a telephone handset according to the present invention.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

General

The present invention permits a user to speed up and slow down speech without changing the speakers pitch. It is a user adjustable feature to change the voice playback rate to the listeners' preferred listening rate or comfort. The present invention permits the adjustment of audio playback rates directly on a device rendering the audio, such as a personal digital assistant, digital tape recorder, messaging service, telephone handset, or any other service where audio is played out through an output buffer when being converted by a D/A through a speaker. The audio adjustment in the present invention preserves the original pitch of the speaker's voice The present invention is compatible with existing hardware by performing transformations directly on the outbound audio buffer without the need of additional memory or the use of a lot of controller overhead.

In another embodiment, the present invention sets the loopback rate the speaker will hear based on their speaking rate. The present invention adaptively controls the playback rate to coerce the speaker to talk at a preset talking rate by evoking a psychological condition in the speaker or talker to speak at a preset rate. If the speaker is talking too fast, the speech is slowed down and fed back to the speaker or earpiece. When the speaker adapts to this slower rate, the feedback speed is realized and the feedback speech is set to normal. The adaptive control mechanism uses syllabic rate detection and time expansion to set the talkers speaking rate.

The present invention describes a methodology to use a speech time compression and expansion device to alter the speaking/hearing rate balance of a talking individual. The present invention evokes a psychological condition on the talker which results in them slowing down their talking rate during a conversation. Let us assume the following scenario: Two people are in a telephone conversation. Person A is listening to Person B talk. Person A is having difficulty understanding Person B since Person A feels Person B is talking too fast. This is a typical scenario for an elderly person such as person A who has difficulties in their temporal resolution of hearing. Person A would like to have the loopback speech of Person B's telephone slowed down such that Person B hears themselves talking slower. Now when the loopback speech rate is lowered, Person B will hear him/herself talking slower and will thus reduce their talking rate in accordance with the motor language model of speech production. The loopback signal is the signal, which is looped back on the telephone to allow the person talking on the telephone to hear himself/herself talking. This is a standard feature on all phones and acts as a perceptual feedback mechanism to reassure the talker that their speech is being heard by the listener. In effect, it is a psychological cue letting the talker know that they are actually talking. Without a loopback signal, the talker does not feel certain that their speech is being sent to the listener and it creates tension in the conversation. For this reason all phones have a loopback signal, which simply passes speech back to the output speaker on the earpiece of the person speaking.

The loopback rate can be 1) set by the listeners or 2) set by the talker. In the latter condition, the speaker may realize they have a fast speaking rate and may selectively choose to have their own loopback rate preset to a slower speed. In the former, the listener is provided the option of adjusting the talker's loopback rate. This simply requires a digital message to be sent from one telephone to the other to change the rate when a button is depressed. An up-down button on the display allows either party to decrease the loopback speaking rate. A second button is used to select which telephone's loopback mode is adjusted, either the listener or the talker. In addition to manual setting, the present invention provides a syllabic rate or word rate method to set the listeners preferred speaker listening rate. The syllabic rate describes the rate of speech by the number of syllables per unit time as a numeric value. The word rate describes how many words are spoken per unit time. For example, if a listener has a preferred hearing rate of N syllables (words) a minute where N is the number of syllables (words), and the present invention determines the current syllabic (words) rate as X syllables/minute, the present invention employs the time compression/expansion utility to change the speaking rate by a factor of N/X. The listener's preferred speaking rate is stored as a parameter value in the telephone as a custom profile for that user. Now, anyone who calls that user will have their loopback rate set to the listener's preferred listening rate.

The present invention, according to a preferred embodiment, overcomes problems with the prior art by enabling users to adjust a preferred listening rate or loopback rate. The loopback rate in one embodiment is set by the listener and in another embodiment set by the speaker. In the latter condition, the speaker may realize they have a fast speaking rate and may selectively choose to have their own loopback rate preset to a slower speed. In the former, the listener is provided the option of adjusting the speaker's loopback rate. This simply requires a message to be sent from one telephone to the other to change the rate when a button is depressed. An up-down button on the display allows either party to decrease the loopback speaking rate. A second button is used to select which telephone's loopback mode is adjusted, either the listener or the talker.

Terminology

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. The program may be stored or transferred through a computer readable medium such as a floppy disk, wireless interface or other storage medium.

Reference throughout the specification to "one embodiment" means that a particular feature, structure, or characteristic described in connection with the embodiment is included in at least one embodiment of the present invention. Thus, the appearances of the phrases "in one embodiment" in various places throughout the specification are not necessarily all referring to the same embodiment. Furthermore, the particular features, structures, or characteristics may be combined in any suitable manner in one or more embodiments. Moreover these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

The term "loopback rate" refers to the rate at which audio is perceived back by a speaker and/or listener. In the present invention this is a selectable rate.

The term "SOLA" is an acronym for Synchronized OverLap and Add refers to the algorithm and method implemented in a combination of hardware and software rate at which audio is perceived back by a speaker and/or listener. In the present invention this is a selectable rate.

The term "DSP" is an acronym for Digital Signal Processor.

The term "Frame" is an acronym for a finite number of speech samples.

Specific to this document (and GSM), a frame is time interval equal to 20 ms, or 160 samples at an 8 kHz-sampling rate.

The term "Window" is a portion of a frame, where one Frame may comprise one or more windows.

The term "Vocoder" is a Method or algorithm for encoding and decoding speech samples to and from an efficient parametrization.

Telephone Handset

Turning to FIG. 1 is a block diagram of a telephone handset 100 according to the present invention. The telephone handset 100 is an exemplary hardware platform for carrying out the present invention. It is important to note that other electronic devices such as digital tape recorders, personal digital assistances (PDAs) and other devices that play, transmit or broadcast recorded or a synthesized voice and the hardware platform of a telephone is only one embodiment in which the present invention is advantageously implemented. Further, the Telephone handset 100 may be included as part of other portable electronic devices including a wireless telephone, PDA, computer, electronic organizer, and other messaging device.

The telephone handset is wired or wireless and is implemented as one physical unit or in another embodiment dividend up into multiple units operating as one device for handling telephonic communications. The telephone handset 100 includes a controller 102, a memory 104, a non-volatile (program) memory 106 containing at least one application program 108, a power source (not shown) through a power source interface 116. The controller is any microcontroller, central processor, digital signal processor, or other unit. The telephone handset 100 transmits and receives signals for enabling a wired or wireless communication, such as a cellular telephone, in a manner well known to those of ordinary skill in the art. In the wireless embodiment, when the wireless telephone handset 100 is in a "receive" mode, the controller 102 controls a radio frequency (RF) transmit/receive switch 118 that couples an RF signal from an antenna 122 through the RF transmit/receive (TX/RX) switch 118 to an RF receiver 114, in a manner well known to those of ordinary skill in the art. The RF receiver 114 receives, converts, and demodulates the RF signal, and then provides a baseband signal, for example, to audio output module 128 and a transducer 130, such as a speaker, in the telephone handset 100 to provide received audio to a user. The receiver operational sequence is under control of the controller 102, in a manner well known to those of ordinary skill in the art.

In a "transmit" mode, the controller 102, for example, responding to a detection of a user input (such as a user pressing a button or switch on a user interface 112 of the device 100), controls the audio circuits and a microphone 126 through audio input module 124, and the RF transmit/receive switch 118 to couple audio signals received from a microphone to transmitter circuits 120 and thereby the audio signals are modulated onto an RF signal and coupled to the antenna 122 through the RF TX/RX switch 118 to transmit a modulated RF signal into a wireless communication system (not shown). This transmit operation enables the user of the telephone handset 1100 to transmit, for example, audio communication into the wireless communication system in a manner well known to those of ordinary skill in the art. The controller 102 operates the RF transmitter 120, RF receiver 114, the RF TX/RN switch 118, and the associated audio circuits (not shown), according to instructions stored in the program memory 110.

Further, the controller 102 is communicatively coupled to a user input interface 107 (such as a key board, buttons, switches, and the like) for receiving user input from a user of the device 100. It is important to note that the user input interface 107 in one embodiment is incorporated into the display 109 as "GUI (Graphical User Interface) Buttons" as known in the art. The user input interface 107 preferably comprises several keys (including function keys) for performing various functions in the device 100. In another embodiment the user interface 107 includes a voice response system for providing and/or receiving responses from the device user. In still another embodiment, the user interface 108 includes one or more buttons used to generate a button press or a series of button presses such as received from a touch screen display or some other similar method of manual response initiated by the device user. The user input interface 107 couples data signals (to the controller 102) based on the keys depressed by the user. The controller 102 is responsive to the data signals thereby causing functions and features under control of the controller 102 to operate in the device 100. The controller 102 is also communicatively coupled to a display 109 (such as a liquid crystal display) for displaying information to the user of the device 100.

The present invention can be realized in hardware, software, or a combination of hardware and software. The present invention can also be embedded in a computer program product, which comprises all the features enabling the implementation of the methods described herein, and which—when loaded in the device 100—is able to carry out these methods.

Figure 2:
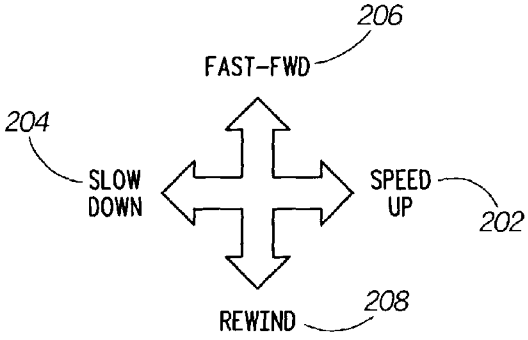
FIG. 2 is an exemplary user input interface for the electronic device of FIG. 1 according to the present invention.

FIG. 2 is an exemplary user input interface 112 for the electronic device of FIG. 1 according to the present invention. Note there is a button implemented as part of the display or as a separate mechanical button for controlling the rate of compression and expansion of an audio wave file speed as further described below. The button in this example has two sets of positions for a possibility of four different types of control to an audio file being rendered. The first set of positions is speed up 202 and slow-down 204, which control the compression and expansion of the audio wave file. The second set of positions is fast forward 206 and slow down 204, which control the position in an audio file being played back such as a digital tape recorder or digital memo accessory to a telephone. It is important to note that the second set of buttons is shown only for completeness in implementing the present invention and only the first set of buttons 202 and 204 are needed to implement the invention.

The present invention is implemented in a small memory footprint and low processor overhead in order to be compatible with currently available portable electronic devices. For example, in one implementation where the controller 102 includes a couple of additional opcodes for particular speeds such as very slow (1.7× original speed), slow (1.4× original speed), fast (0.85× original speed), and very fast (0.65× original speed) requires a program memory space of about 620 bytes and a volatile memory size of about 13 bytes.

Optional Wireless Interfaces

In one embodiment, the telephone handset 100 implements a wireless interface (not shown) and includes a Bluetooth wireless interface, a serial infrared communications interface ("SIR"), a Magic Beam interface and other low power small distance wireless communication interface solutions, as are well known to those of ordinary skill in the art.

The use of these optional wireless interfaces permits the separation of components in telephone handset 100 such as the transducer 100 and microphone 126 from the physical telephone handset 100.

Speech Rate Method and Algorithm Overview

A syllable is defined as a unit of spoken language consisting of a single uninterrupted sound formed by a vowel, diphthong, or syllabic consonant alone, or by any of these sounds preceded, followed, or surrounded by one or more consonants. A diphthong is a complex speech sound or glide that begins with one vowel and gradually changes to another vowel within the same syllable. Every syllable begins with one consonant and has only one vowel. The number of syllables can be determined from a grammatical sentence by examining the text vowel content as follows:

count the vowels in the word;

subtract any silent vowels; and subtract one vowel from every dipthong (diphthongs only count as one vowel sound).

The number of vowels left is the same as the number of syllables. This is a general method of determining the number of syllables given the contextual representation of a speech sentence.

Effectively, the number of syllables that you hear when you pronounce a word is the same as the number of vowels sounds heard. For example: The word "jane" has 2 vowels, but the "e" is silent leaving one vowel sound and one syllable. The word "ocean" has 3 vowels, but the "ea" is a diphthong, which counts as only one sound, so this word has only two vowels sounds and therefore, two syllables. Vowels consist of formant regions, which are high-energy peaks in the frequency spectrum. Vowels are characterized by their formant locations and bandwidths. The vowels are generally periodic in time, high in energy, and long in duration. For these reasons vowel detection methods typically rely on a measure of periodicity such as pitch and/or energy. One such measure of periodicity is the zero crossing information, which is a measure of the spectral centroid of a signal. The dominant frequency principle shows that when a certain frequency band carries more power than other bands, it attracts the expected number of zero crossings per unit time. The zero crossing measure precipitates a measure of periodicity, which can be utilized in a voicing level decision. Pitch detection strategies can also elucidate the voicing level of speech. The autocorrelation function is a typically used in vocoder systems to obtain an estimate of the speech pitch. The autocorrelation reveals the degree of correlation in a signal and can be used with an iterative peak picking method to find the number of lags, which correspond to the maximum correlation. This lag value is a representative value of the speech pitch information and thus the level of tonality of voicing. Thus any such method, which precipitates a level of the speech voicing can be used to determine the syllabic rate. Accordingly, a measure, which utilizes speech energy information, can be used for word segmentation to determine the speech word rate.

The preferred speaking rate can also be applied with time-scale speech modification such as the Synchronized OverLap and Add ("SOLA") method to text-to-speech message synthesis as further described below. Text-to-speech systems generate speech from text messages. Text messaging requires less bandwidth than voice. The speech rate of the text-to-speech device can be altered through time-scale modification given the synthesized speech rate and the preferred listening rate. The preferred speaking rate can also be applied to voice instruction systems such as voice reply navigation, tutorial Internet demos, and audio/visual follow-along graphical displays.

Figure 3:
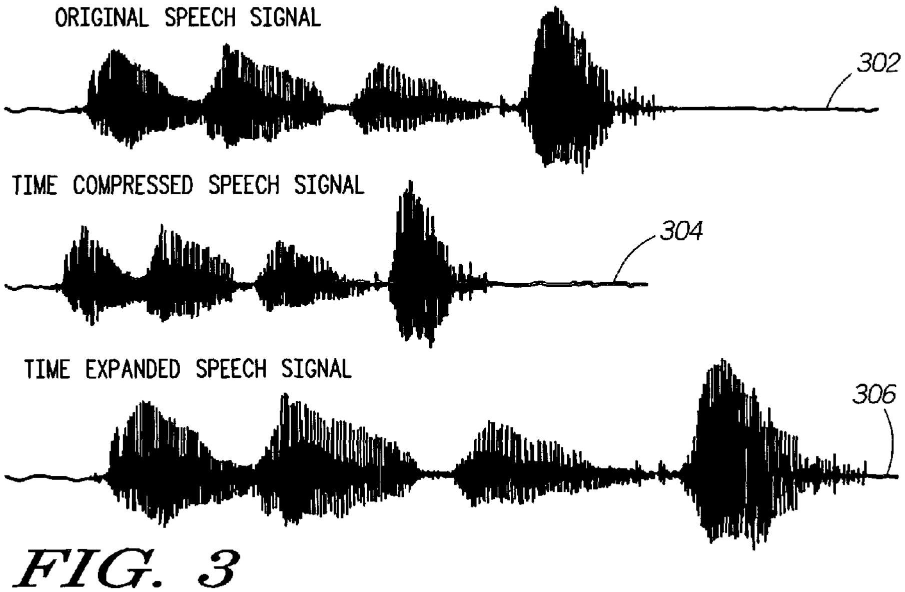
FIG. 3 is a series of time-based speech samples illustrating time compression and time expansion of an original speech signal according to the present invention.

Referring now to FIG. 3 is a series of time-based speech samples illustrating time compression and time expansion of an original speech signal according to the present invention. Original speech signal 302 is illustrated as compressed in 304 and expanded in 306. Notice that the over all shape of the speech signal is the same in each of the figures and just the horizontal time element is altered.

High Level Overview Of Real-Time SOLA in a Single Output Audio Buffer

Described now is the design implementation of a synchronized overlap and add method for temporal compression and expansion of vocoded and non-vocoded speech. This method uses a SOLA (Synchronized Overlap and Add) method to blend two frames of speech in the region of maximum correlation to produce a time compressed or expanded representation of two speech frames. Since the method operates on a frame-by-frame basis, the speech rate is dynamically changed as speech is being played out through the speaker. Frames are on the order of 20 to 30 ms. The SOLA method allows for both time compression and expansion. Time compression is a process, which blends periodic sections of the speech signal. The blending is a triangular overlap and add technique used to smooth out the shifted frame boundaries. Time expansion is essentially a process, which replicates and inserts sections of periodic speech and performs the same blending to smooth the transition regions. SOLA automatically operates on the voiced sections of speech such as the vowels. Vowels are known as the voiced regions since they are tonal due to the articulatory gestures involved in their creation. The vocal tract forms a cavity in which quasi-periodic pulses of air pass through and create the sound the present invention call speech. The vowels are periodic and provide the correlation necessary to achieve time compression and expansion with the SOLA method.

Figure 4:
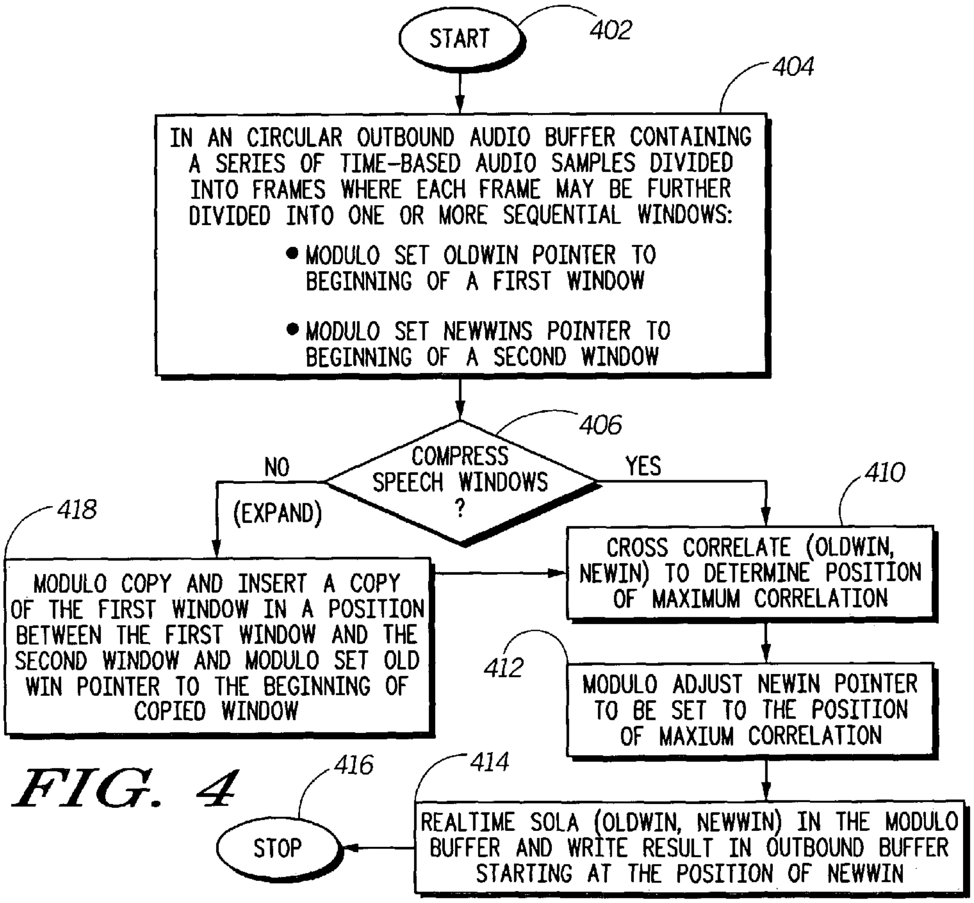
FIG. 4 is an over all flow diagram corresponding to the over all process of performing real-time SOLA operations in a single outbound circular audio buffer using modulo pointers as shown in FIGS. 4-19, according to the present invention.

FIG. 4 is an over all flow diagram corresponding to the over all process of performing real-time SOLA operations in a single outbound circular audio buffer using modulo pointers as shown in FIGS. 6-16, according to the present invention. It is important to note the entire process occurs in the outbound audio buffer of an electronic device such as a limited space audio RAM buffer (not shown) in audio module 128. This is important because the entire operation happens on the "fly" and while audio is played out a digital-to-analog converter (not shown) to a speaker 130. The process begins on step 402 and proceeds directly to step 404. In step 4, two sub-windows A2 502 and B1 504 of FIG. 5 of an audio sample consisting of two frames (frame 1 506, frame 2 508) are selected based upon from where in the buffer the current audio information is being read from and played through speaker 130.

The present invention integrates easily with outbound module audio buffers by:

- keeping track of the pointers;
- determining if there is sufficient room for processing on the modulo audio buffer; and
- writing data on the modulo audio buffer which so as not to overwrite any previously processed audio set or currently being rendered through audio output module 128 speaker 130.

In the simplest embodiment of the present invention there are four pointers to the outbound audio buffer as follows:

1. Read pointer—point from where in the circular audio buffer the samples are being read and played through speaker 130. The position of this pointer is not adjusted in the present invention but rather the position of the read pointer moves modulo through the buffer playing out audio samples.
2. Write pointer—point where updates to the audio buffer are written. This pointer is adjusted based on where in the buffer the SOLA operation is being performed
3. Oldwin pointer—pointer to the start of an old window in a frame
4. Newin pointer—pointer to the start of a new window in a frame immediately adjacent in time to the old window. The frame for the oldwin pointer and the new window pointer do not have to be the same frame but rather the frames only need to be adjacent in time.

It is important to note that the rate of expansion and compression cannot exceed the rate in which data is being written into the circular audio buffer. As long as there is sufficient space in the audio buffer, the number of frames and/or windows being processed at any given time can change. This enables Speed slow down and speed up as audio is being played out of the buffer in real-time.

Figure 5:
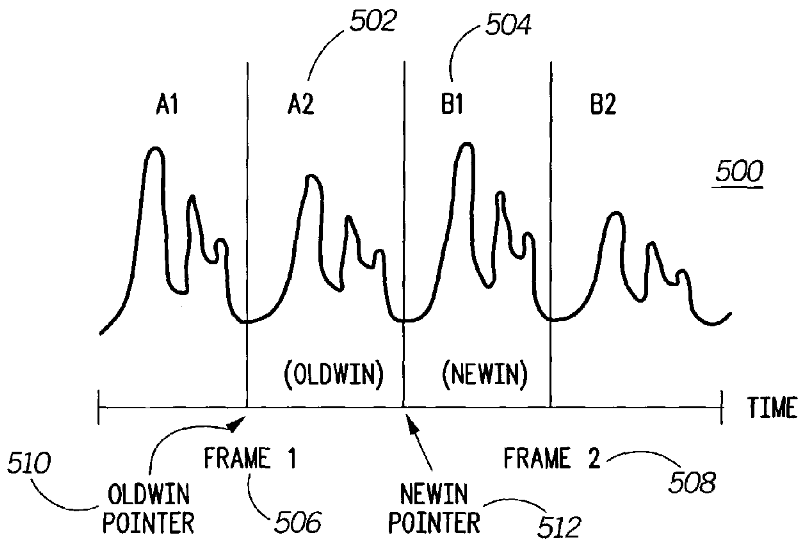
FIG. 5 is a time-based speech sample in the circular audio output buffer illustrating frames, windows and pointers for SOLA compression and expansion operations, according to the present invention.
Figure 6:
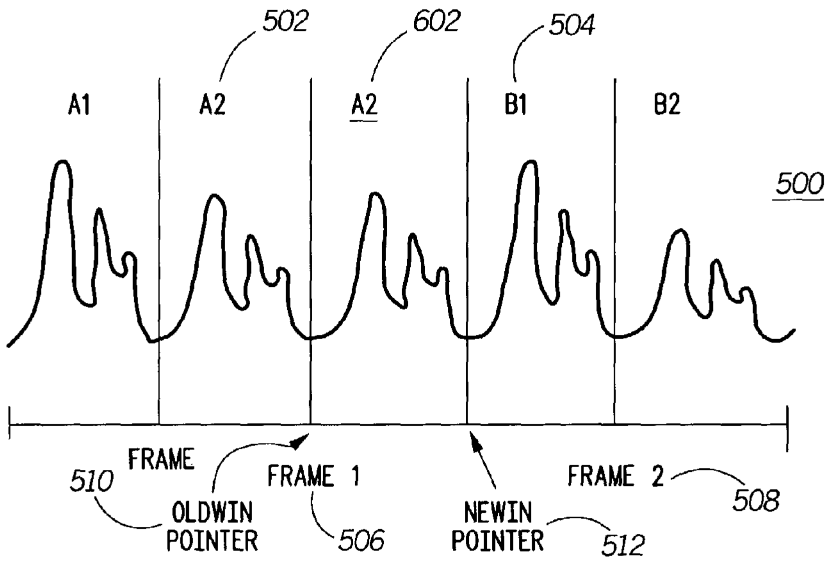
FIG. 6 is a time-based speech sample in the circular audio output buffer illustrating frames, windows and pointers for SOLA operations for an expansion operation, according to the present invention.
Figure 7:
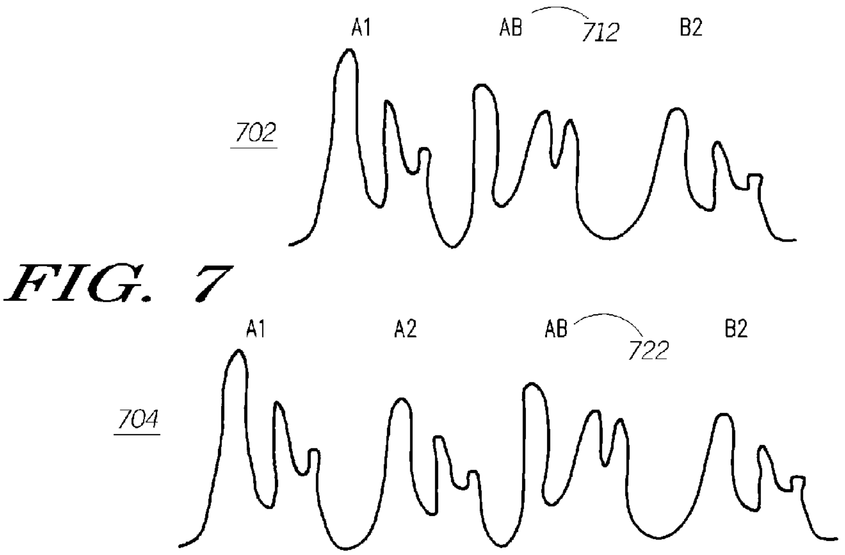
FIG. 7 is a time-based speech sample in the circular audio output buffer illustrating the resulting frames for SOLA compression and expansion operations.
Figure 8:
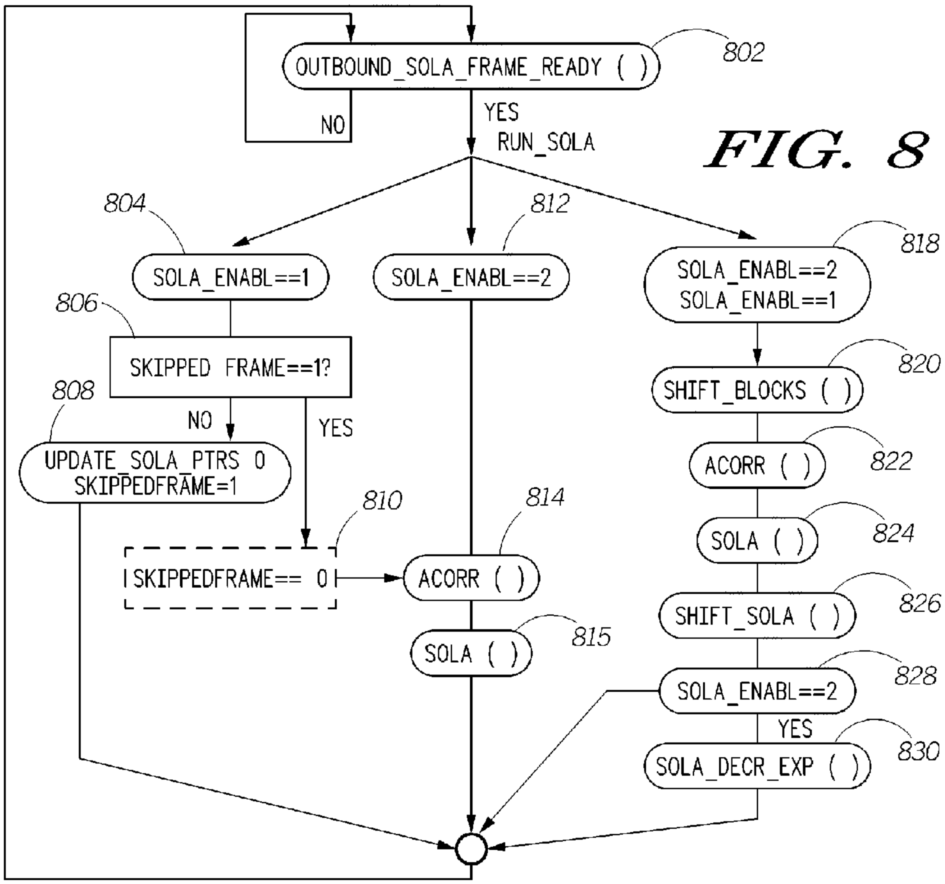
FIG. 8 is a state diagram illustrating the algorithm configurations for various rate selections, as discussed in the low-level design section, according to the present invention.

Next a test is made in step 406 whether the SOLA operation will be applied to compress (i.e. speed up) or expand (i.e. slow down) two adjacent windows of speech samples. In the case where the speech is to be expanded the process continues in step 408. As shown in FIG. 6, the speech sample in A2 oldwin 502 are copied and inserted in between oldwin A2 and B2 newin 508 as shown as A2 oldwin 602. Next the pointer for oldwin 510 is adjusted to point to the beginning of A2 oldwin 602. Therefore a duplicate 602 of window 502 now exists in the buffer. Next, the process continues in step 410 for both compression and expansion of the speech window (after a copy of the oldwin was inserted in step 408 for expansion). A cross correlation (oldwin, newin) is performed to determine position of maximum correlation. In the case where an expansion is being performed the oldwin is A2 oldwin 602 as shown in FIG. 6 and for a compression the oldwin is A2 oldwin 502 as shown in FIG. 5. Next in step 414 a real-time SOLA (Synchronized OverLap and Add) operation is performed where the data is written, using write pointer, into the audio output buffer at a position of maximum correlation and the process ends at step 416. The output of the SOLA operation in place on the circular buffer is shown for compression in graph 702 and for expansion in graph 704 of FIG. 7. Notice the SOLA region AB 712 looks a lot like the SOLA region AB 722. This is because the blending of A2 and B2 in both cases. Specifically for compression, as illustrated in graph 702, the oldwin A2 and newin B11 are now combined into one region AB 712. For expansion, as illustrated in graph 704, oldwin A2 was copied prior to being blended. This provides an over view of the operation. Different rates are achieved by varying the size the region of overlap to which the SOLA is performed. Stated differently, for two times, compression or expansion, the region A1+A2 is used instead of simply A2, and the region B1+B2 is used instead of simply B2. Next, more specifics of each step in the flow chart of FIG. 4 are now described.

In one embodiment, the present invention uses FOUR rate adjustments used in the audio playback speed: Very slow (~1.7x), slow (~1.4x), fast (~0.8x) and very fast (~0.6x), where x describes the multiplicative change in time. So very slow means it plays it back 1.7 times as slow. These numbers are approximate rate changes, since the procedure is dependent on the speakers pitch. All four modes utilize the SOLA method. It is important to note that other number and rates of playback are within the true scope and spirit of the present invention. The different modes are selected by the state algorithm configuration which is one of two states: expansion or compression, and of one of two levels: half or full. In full compression, the SOLA blending is performed on every entrant (new) frame. In half compression, the SOLA blending is performed on every other frame, and requires only a simple flag. The expansion mode is essentially the same as compression and only requires a frame duplication before the SOLA method. In full expansion, every frame is duplicated before the SOLA method. In half expansion, the frame replication and SOLA method are performed on every other frame. The half rate selection is a simple integration effort since it only requires a pointer location update. A flag is not required for half expansion. FIG. 6 is a state diagram 600 illustrating the algorithm configurations for each of the four rate selections, which are discussed in further detailed in the section entitled "Detailed Overview Of SOLA Speech Time Compression" below.

The following steps demonstrate the SOLA method to blend two frames of speech in the region of maximum correlation to produce a time-compressed representation of the two speech frames. The SOLA compression method is presented first since expansion is a simple extension of the compression method. The SOLA subroutine requires a new frame of speech passed each subroutine call for complete speech compression. The new speech frame is processed with the results of the previous speech frame. The processed speech remains on outbound audio buffer, such as in the audio output module 128, or non-volatile memory 108, and the pointers are then updated to denote this section as the previous speech frame for the next SOLA method call.

Figure 9:
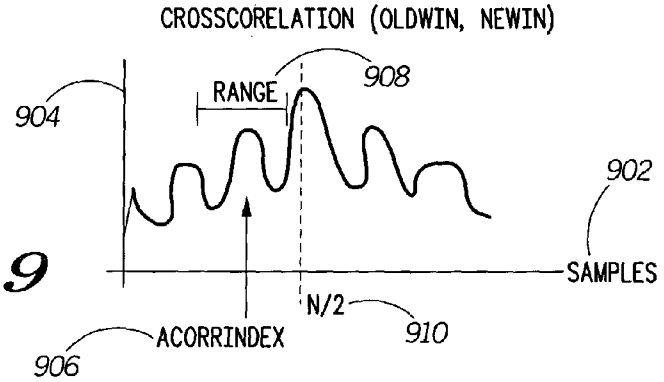
FIG. 9 is a graph illustrating the first step of the SOLA method where a determination of the maximum correlation point of two speech frames is made, according to the present invention.

STEP 1: A graph 900 as shown in FIG. 9, illustrates the first step of the SOLA method after pointers are correctly setup as shown in FIG. 4. In this step, which is a graphic representation of step 410, a determination of the maximum correlation point of two speech frames is made, according to the present invention. Illustrated is the maximum correlation point of two speech frames and return the highest correlation index of the crosscorrelation function 904 of oldwin A2 502 (or in the case of expansion oldwin A2 602 and it should be understood that the term oldwin can refer to either 502 or 602 depending on whether expansion or compression is being performed) and newin B1 504. Oldwin A2 502 is the speech frame processed from the previous SOLA cycle. Newin B1 504 is the current speech frame just placed on the outbound audio buffer. For both modes of SOLA compression, the determination of the maximum correlation is restricted to a correlation range 908, which is exactly half the speech frame length. If the frame length is N samples 902, the index-must fall between 0 and N/2 910. This provides a maximum compression of two. A more sophisticated subsearch not utilized herein specifies the maximum correlation point within a range between samples of the pitch period. The crosscorrelation maximum is determined in real time, and so a determination of the maximum requires only a comparison of the last previous maximum. Only 1 data word x:acorrindex 906 is required for the entire process since each new speech frame has a new local maximum. The returned acorrindex 906 specifies the number of samples to left shift newin B2 for maximum correlation before blending.

Figure 10:
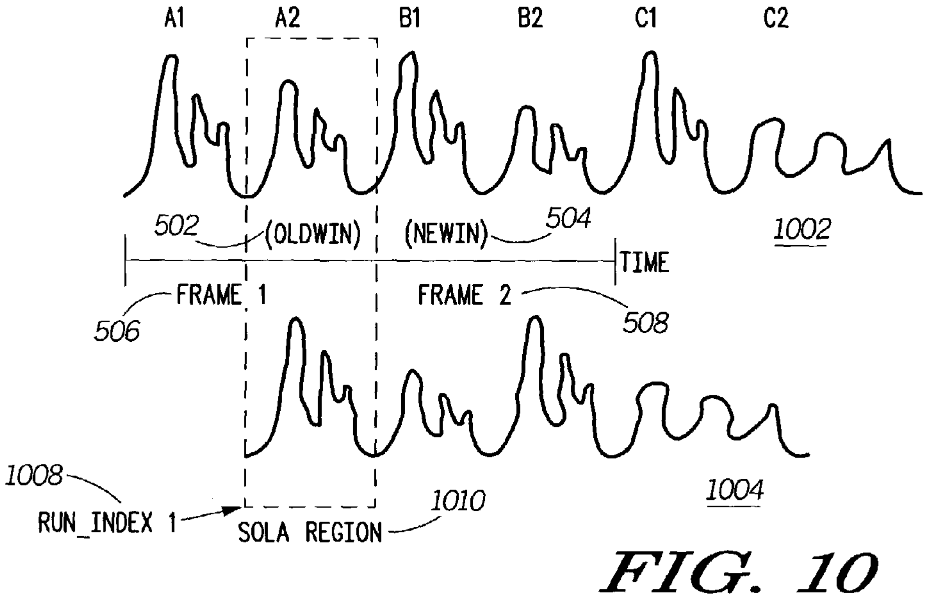
FIG. 10 are two graphs illustrating the second step of the SOLA method where a new frame is to overlap with an old frame at the point of corresponding maximum correlation is illustrated, according to the present invention.

STEP 2: Turning now to FIG. 10, shown are two graphs 1002 and 1004 illustrating the second step of the SOLA method where a newin B1 504 in frame 2 508 to overlap with newin A1 602 in frame 1 506 at the point of corresponding maximum correlation is illustrated, according to the present invention. As shown the position of newin 504 is to overlap with oldwin 502 at the point of corresponding maximum correlation. This point, x:rundindex1 1008, is the subtraction of the correlation index (acorrindex 906) from the endpoint location of oldwin A2 502 on the outbound audio buffer. The region between this point and the end of oldwin A2 502 is the SOLA region 1010. Only the first acorrindex 906 samples of newin 504 will be used in the blending since acorrindex 906 describes the number of samples to shift back newin 604 for maximum correlation. Accordingly, only the last acorrindex 906 samples of oldwin 602 will be used in the blending. Thus, the remaining samples of newin 604 (i.e., the frame length minus acorrindex 906) will need to be left shifted after SOLA processing to abut with the blended region.

Figure 11:
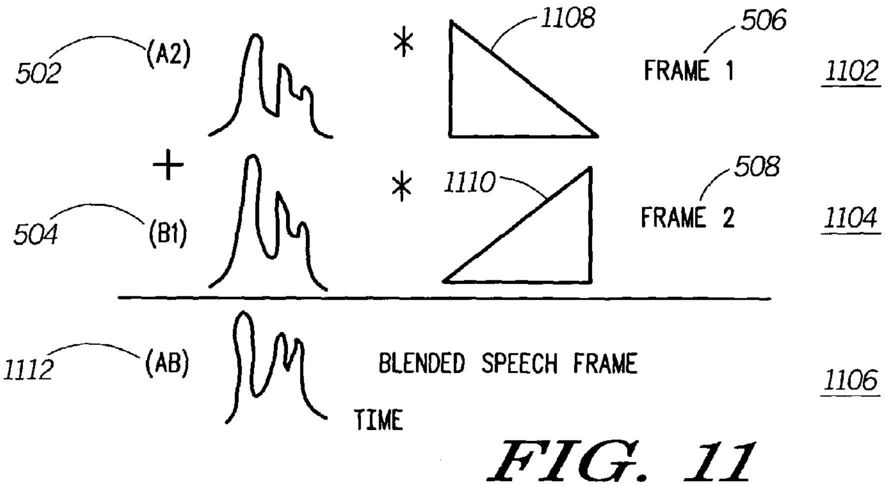
FIG. 11 are three graphs illustrating the third step of the SOLA method where synchronized overlap and add is begun over SOLA region, according to the present invention.

STEP 3: FIG. 11 is three graphs 1102, 1104, and 1106 illustrating the third step of the SOLA method where synchronized overlap and add is begun over SOLA region 1010 according to the present invention. A linear downramp 1108 is applied to a oldwin A2 502, and a linear up ramp 1110 is applied to newin B1 504 to blend the speech in this region. Blend speech fame 1112 in SOLA region 910 by applying a linear ramp to speech in SOLA region 910 and then adding the two signals together.

Figure 12:
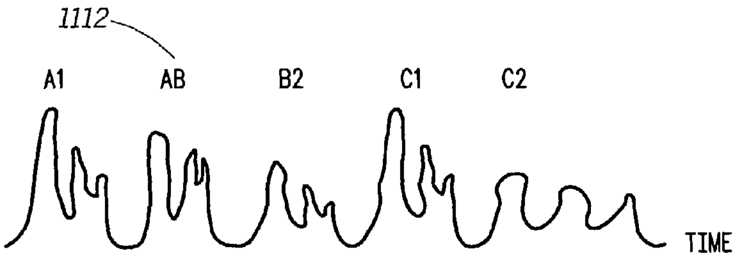
FIG. 12, shown is a graph of a composite speech signal for which subframes A2 and B1 have been blended into an AB subframe for speech compression, according to the present invention.

STEP 4: FIG. 12, is a graph 1100 of a composite speech signal for which windows oldwin A2 502 and newin B1 502 have been blended into an AB subframe 1112 for speech compression, according to the present invention. Leave speech between beginning of oldwin pointer 510 and runindex1 on outbound audio buffer. This region does not contain the current processed SOLA region. The SOLA region, which was the overlapped speech region, is processed directly on the buffer. The remainder of newin B1 504 must be shifted towards oldwin A2 502 to append the unmodified data. Runindex1 will now specify the beginning of oldwin 602 for the next SOLA cycle. Steps 1 to 4 are repeated and performed for each new frame of speech placed on the audio buffer. This is how time compressed speech is generated. These steps also allow the dynamic rate adjustment for SOLA as speech is being played out since the compression is adjustable on a frame-by-frame basis. This is covered in the next section. NOTE: SOLA operates on data in the outbound voice buffer. Both frames (oldwin A2 502, newin B1 504) are sequential and adjacent in the outbound buffer. The SOLA processing is performed in place in the buffer and the OB_Voice_Wptr (as described below) must be updated accordingly. The SOLA support routines in the next sections perform the ob_voice_buf_wptr updates.

The OB_Voice_Wptr is the main outbound buffer voice pointer that tells the codec where to read the next data samples to play out the speaker 130. The OB_Voice_Wptr stands for OutBound (OB) and is a standard pointer to stream audio samples out similar to the InBound (IB) voice pointer for acquiring samples. As known to those of average skill in the art, typically audio capturing/recording devices have an IB and OB pointer to direct a codec where to get/play audio samples. The present invention updates the OB pointer after the SOLA procedure since the audio data has been rearranged on the outbound audio buffer. By updating the OB pointer the continuity of the audio is preserved (i.e., the processed frames are congruent with neighbor frames). Accordingly, the OB pointer is re-positioned backward or forward in the module outbound audio buffer based on the SOLA processing performed. Specifically in the case of SOLA compression processing, audio samples are discarded and therefore the OB pointer is re-positioned backward in the outbound audio buffer. In the case of SOLA compression processing audio samples are being added through and therefore the OB pointer is re-positioned ahead a few samples. It is important to note that the OB pointer updates are included to process audio on an outbound audio buffer of fixed data length on a real time system. In contrast to prior art system, SOLA routines are all processed not in real-time on the outbound audio buffer but rather processed and buffered separately in additional memory space and not in the outbound audio buffer. The present invention is processing audio samples in the outbound audio buffer on a frame-by-frame basis in real time. The SOLA support routines in the next sections perform the ob_voice_buf_wptr updates.

Detailed Overview Of SOLA Speech Time Compression

This section contains a general description of the low-level design function adjustment modes, which are specified by the implementation of the SOLA method as described in this section. The following functions are illustrated in the state diagram 600 of FIG. 6.

Outbound_sola_frame_ready( )

Figure 13:
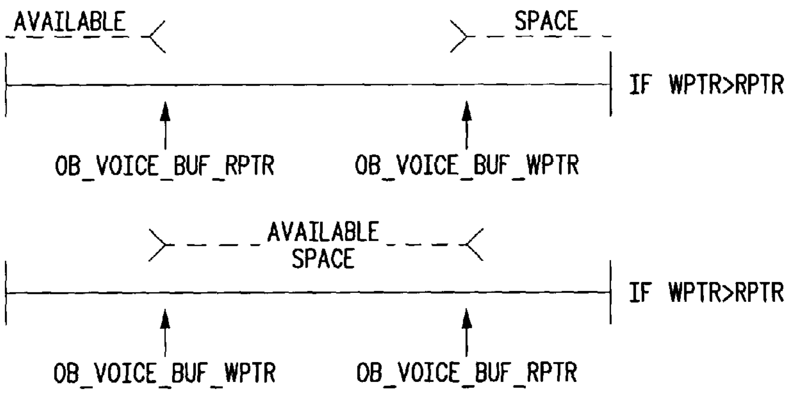
FIG. 13 is a diagram of the pointers for the method outbound_sola_frame_ready( ) to check if adequate space exists, according to the present invention.

Turning to FIG. 13, shown is a diagram of the pointers for the method outbound_sola_frame_ready( ) to check if adequate space exists according to the present invention. Outbound_sola_frame_ready( ) 402—This method checks to see if adequate space exists on the outbound voice_buffer for SOLA processing. The standard procedure for playback of digitized and/or recorded voice is to check if there are at least N samples of free space available to decode the vocoded speech where N is the speech frame length. If N samples are available, a call to the decoder is made and the samples are placed on the outbound buffer beginning at the ob_voice_buf_wptr. After the data is placed, a call to Incr_OB_Voice_Buf_Wptr is made to update the write pointer by a frame length. The amount of available space is determined as the difference between the ob_voice_buf_wptr and the ob_voice_buf_rptr. The subroutine Outbound_Voice_Frame_Ready checks to ensure there is at least one frame of space available.

In SOLA compression the Outbound_Voice_Frame_Ready call is sufficient since no more data will be added to the voice buffer and the data is already available on the buffer for SOLA processing. For both modes of SOLA expansion however, frame duplication is necessary which requires more space on the outbound buffer. The frame duplication replicates 1 half frame for every speech frame. It is thus necessary to ensure that there are at least 1.5 frames of additional space on the outbound buffer before a call to SOLA is made. In this implementation the present invention actually makes sure that there are at least 2 speech frames of space available. Thus, the call to Outbound_sola_Frame_Ready checks to see it at least 2 frames of speech data are available before any calls to SOLA are made. SOLA compression is unaffected so this method is used for both compression and expansion.

Acorr( )

Acorr( ) 402, 422—The precursor method to SOLA is always a call to the crosscorrelation method for both speech time expansion and compression. The acorr method determines the maximum correlation lag index between the oldwin and newin speech frames. This lag index describes the number of samples to left shift the newin frame is to overlap with the oldwin frame. As mentioned previously, there is an crosscorrelation range to search for the lag, which is 0 to N/2 for the two compression modes and 0 to N/4 for the two expansion modes, where N is the frame length. For compression, a larger search range provides maximal compression, and for expansion a smaller search range provides maximal expansion. The sola_enable_cf data word specifies the type of rate adjustment: (+2) full compression 412, (+1) half compression, (+1) 404, half expansion 418, and (−2) full expansion 418. NOTE: These numeric values are to select the SOLA mode. A (+) value denotes compassion and a (−) value denotes expansion. The numeric vales of 1 and 2 are only to designate the mode level as half or full. The sola_enable_cf also sets the range for the crosscorrelation lag search on every call to the acorr method. Thus, compression and expansion levels can change the playback rate as speech is being played. If sola_enable_cf is positive the range 0 to N/2 is selected by a right shift of 1, and if sola_enable_cf is negative the range 0 to N/ 4 is selected by a right shift of 2 given the frame length N.

Update_sola_ptrs( )

Figure 14:
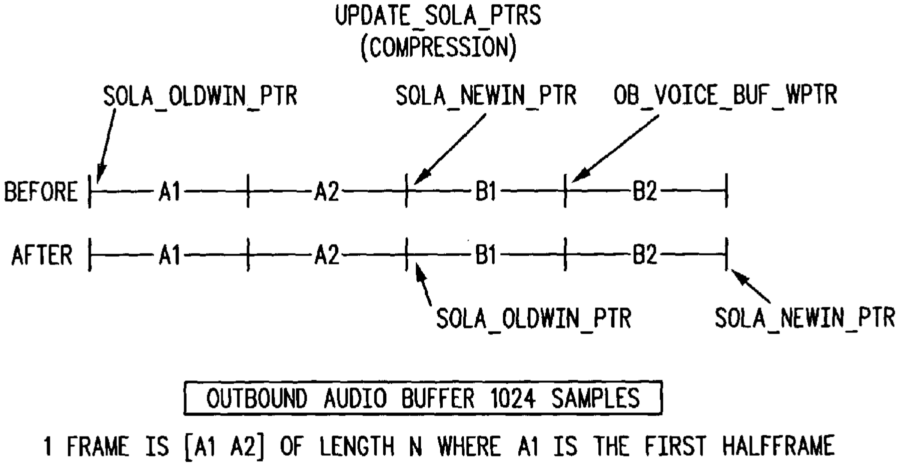
FIG. 14 is a diagram of the pointers for the method update_sola_ptrs ( ) to update the sola pointers by a frame length for compression, according to the present invention.

FIG. 14 is a diagram of the pointers for the method update_sola_ptrs ( ) to update the sola pointers by a frame length for compression, according to the present invention. Update_sola_ptrs( ) 408—As illustrated in FIG. 14, this module updates the SOLA pointers by a frame length as a simple way to reduce the compression level by a factor of two. Recall, that the SOLA method itself updates the SOLA pointers after SOLA processing. In full compression, this means that the ob_voice_buf_wptr and sola_newin_ptr will be pointing to the same point after the SOLA call. For half compression, it is thus necessary to place another full speech frame on the outbound buffer before the pointers are updated by a speech frame length. Thus the half-compression method only performs a SOLA operation on every other voice data ready call. Hence, the skipped Frame flag (sola_skipbit) toggles states to signify when SOLA should be called as seen in the high-level design of FIG. 4 to make sure speech data is on the buffer.

Figure 15:
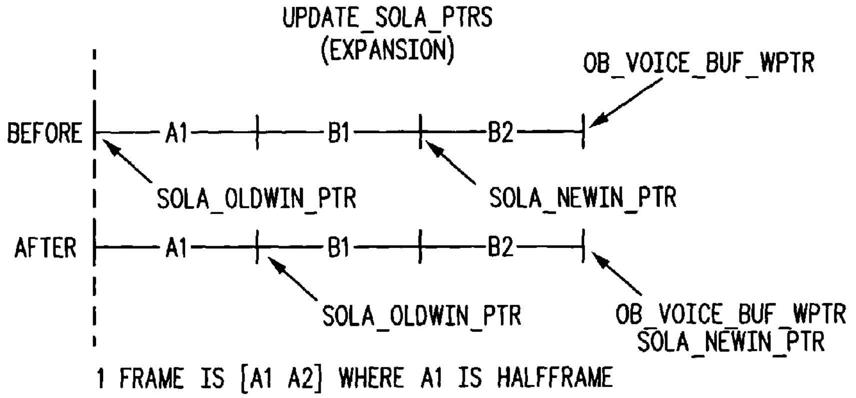
FIG. 15 is a diagram of the pointers for the method update_sola_ptrs ( ) to update the sola pointers by a frame length for expansion, according to the present invention.

This module decreases the expansion effect of sola by half and gives rise to the half expansion rate mode setting. In full expansion, every speech frame is duplicated and followed by the SOLA method. The SOLA method blends the duplicated frame with the copied frame. In half expansion, only every other subframe is duplicated. FIG. 15 is a diagram of the pointers for the method update_sola_ptrs( ) to update the sola pointers by a frame length for expansion, according to the present invention. The simplest way to do this is to increment the SOLA pointers by a half frame length after the call to the SOLA method. This is the exact same procedure as for the compression update, except it updates the pointers by a half frame length instead of a full frame length.

Shift Blocks( )

Figure 16:
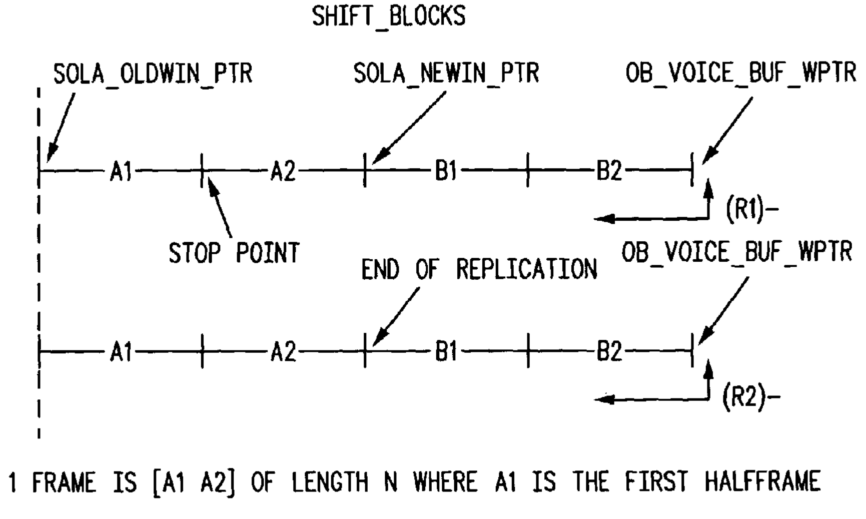
FIG. 16 is a diagram of the pointers for the method shift_blocks ( ), according to the present invention.

FIG. 16 is a diagram of the pointers for the method shift_blocks ( ), according to the present invention. Shift Blocks( ) 420—The next two subroutines shift_blocks and shift_sola extend the sola speech compression method for speech expansion. The expansion method requires frame duplication followed by the sola method. Essentially expansion is compression of replicated speech frames. The replication provides the additional data for time expansion and the sola provides the blending to remove duplicate frame boundary discontinuities. It is necessary to shift all data above sola_newin_ptr up to ob_voice_buf_wptr. Then, the present invention replicates the half frame block just below sola_newin_ptr.

IMPLEMENTATION: set r1 at ob_voice_buf_wptr set r2 one half voice frame above ob_voice_buf_wptr. Then copy data from r1 to r2 by decreasing both pointers (r1-),(r2-). Stop when r1 reaches the end of the frame to duplicate which is ½ frame below sola_oldwin_ptr. This is a total loop of: ob_voice_buf_wptr-sola_newin_ptr+N/2

Shift Sola( )

Figure 17:
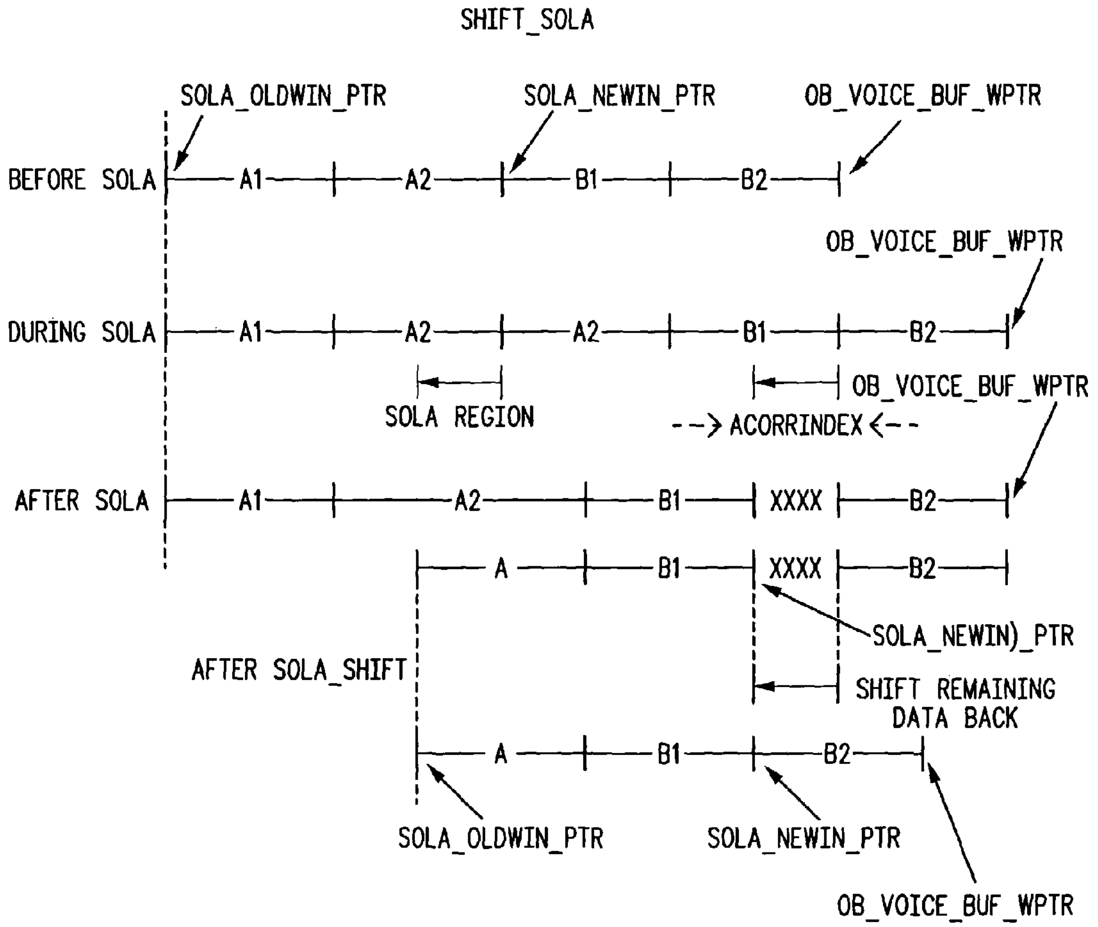
FIG. 17 is a diagram of the pointers for the method shift_sola( ) according to the present invention.

FIG. 17 is a diagram of the pointers for the method shift_sola ( ), according to the present invention. Shift Sola( ) 426—Sola only returns processed data between the sola_oldwin_ptr and sola_newin_ptr region. It is not aware of the location of the ob_voice_buf_wptr or the relation to other data on the outbound voice_buffer. It is thus necessary to shift back all data above sola_newin_ptr to the left by the shift back amount (acorrindex) after a call to sola. This is particularly important for the expansion mode since the ob_voice_buf_wptr and sola_newin_ptr will point to different places after each sola call. Recall, that the Outbound_Sola_Frame_Ready routine checks to see whether there is sufficient room on the buffer for expansion and places data accordingly. The expansion rate determines the rate at which data is placed on the outbound buffer correlated with the ob_voice_buf_wptr as they are in compression. In compression, the sola_newin_ptr is aligned with the b_voice_buf_wtpr after each sola function call. This is not the case in expansion. It is thus necessary to shift back data on the outbound buffer between sola_newin_ptr and the ob_voice_buf_wtpr after each sola function call. This is the purpose of the shift_sola method. Once the data is shifted back the speech on the outbound data buffer is contiguous and correctly represents the blended continuous speech. It should be noted that most integration problems with sola implementation are related to the sola pointer updates and incorrect updates to the ob_voice_buf_wptr rather. The acorr( ) and sola( ) methods themselves are extremely robust and most implementation errors are due to pointer updates.

Exemplary Assembly MatLab Coding of SOLA

FIGS. 18 and 19 are high-level MatLab code for caring out the SOLA operations, according to the present invention. As it understood by those of average skill in the art, the high-level MatLab code (MATLAB is a registered trademark of Mathworks Inc.) is exemplary only for the SOLA operations and the implementation of modulo pointers for a limited buffer size and buffer updates must be added as shown above in FIGS. 4-17.

Speech Rate Setting on a Speaker's and/or Listener's Handset

In this embodiment, the use of SOLA audio compression/expansion is used as described above in FIGS. 4-19. Turning to FIG. 20, shown is a block diagram of an embodiment illustrating how loopback combined with SOLA processing is used to adjust speech rate, according to the present invention, shown are two wireless telephone handsets 2002 and 2004 corresponding to exemplary hardware platform of FIG. 1. Shown is the loopback path 2012 for Telephone Handset A 2002 and 2014 for Telephone Handset B 2004. The loopback path is an audio path, known to those in the telephony art where a person such as User A (not shown) using Telephone Handset A, 2002 is able to hear through speaker 130 their own voice when spoken into microphone 124. Loopback paths are widely used and deployed in a variety of telephony applications. The communications infrastructure is greatly simplified in the present invention because the details are not important to carrying out the invention. Besides the two loopback paths 2012 and 2014 shown for Telephone Handset A 2002 and Telephone Handset B 2004 shown is a typical audio path between two Telephone Handsets 2022 and 2024. Audio path 2022 is shown from microphone 124 of Telephone Handset A 2002 through communications infrastructure (2030 to the speaker 130 of Telephone Handset B 2004 indicating that audio signals in the microphone 124 of Telephone Handset A 2002 besides being looped back 2012 is are also audible through speaker 130 of Telephone Handset B. Similarly in the other direction, audio through microphone 124 of wireless device 2004 is sent through communications infrastructure 2030 to speaker 130 of Telephone Handset A 2002 along with the loopback path 2014. Again this diagram is greatly simplified showing a general communication infrastructure 2030. The communications infrastructure 2030 in one preferred embodiment is wireless but any communications infrastructure including wire, wireless, broadcast, PSTN, satellite and Internet is within the true scope and spirit of the present invention.

Returning to FIG. 20, illustrated are two handsets, Telephone Handset A 2002 and Telephone Handset B. In this example when User A speaks her voice is audible through User B's Telephone Handset B through communication infra structure 2030. In addition besides User B hearing the audio from User A speech, User A hear her own voice through loopback 2012. If User B believes User A is speaking at too rapid a rate, User B using user interface 112 such as the button shown in FIG. 2 adjusts the loopback path of User A's Telephone Handset A. The loopback rate is altered using the real-time SOLAR method on the audio output buffer in audio module 128. The only communication between the two telephone handsets 2002 and 2004 is a rate variable, which is inserted in the audio data being communicated between the telephone handsets. The selectable rate variable (a single bit or byte) sent from one telephone handset to the other to change the rate when a button 112 is depressed. In one embodiment, the rate variable is in a message as a simple number or flag representing the percent change in either speed up or slow down of the loopback rate. The message is coupled to an up-down button on the display, and allows either party to decrease the loopback rate. A second button is used to select which telephone's loopback mode is adjusted, either the listener or the speaker (i.e. talker). The exact format of the rate variable is unimportant and is inserted dynamically which when received by a corresponding handset switches the SOLA rate as described above.

Returning to the example, if User B decides to slow down User's A speaking rate, then after selecting a slower rate, this variable is sent to User A's Telephone Handset 2002. By adjusting the feedback speech rate in the loopback path 2012 of Telephone Handset A 2002 so the actual rate User A is speaking is played back through the loopback path 2002 for User A to hear at a slower rate, this effect psychologically coerces the User A, the speaker, to change her speaking rate. Stated differently, when the speed or rate of speech communicated by a person is talking is slowed down (or sped up) and played back through earphones to the person talking, the person talking will slow down her speaking rate in an attempt to maintain the speaking rate she is hearing. This is the result of a known self-correcting mechanism in the motor language model of speech production, which balances the rate at which speech is spoken to the rate at which that speech is heard internally. Accordingly, in this example User A adapts to the rate at which she hears her voice. When she gets to a certain talking rate, which is set by the listener User B, set on the User B's Telephone Handset 2004, her Telephone Handset 2002 adjusts the speed of the rate in loopback path 2012 or loopback rate to match. The playback rate will automatically vary when she departs from this rate and will adjust to the preferred listening rate User B set on Telephone Handset B.

The following scenario further illustrates the example in the paragraph above using the following steps:

1) User A speaking at N words/second.
2) User B wants User A to talk slower.
3) User B hits the slow down button 112 on his Telephone Handset B for User A's loopback rate on her Telephone Handset A 2002.
4) A message is sent to User A's Telephone Handset A 2002.
5) SOLA time expansion is invoked on Telephone Handset A 2002.
6) Speech is slowly slowed down on User As loopback path 2012.
7) User A begins to talk slower since she hears herself slower.
8) Control module measures speaking rate.
9) If desired rate reached (SOLA rate kept constant).
10) If desired rate exceeded (SOLA rate increased).
11) If desired rate under (SOLA rate decreased).

The present invention allows the speakers speech rate to be changed dynamically as the loopback rate is adjusted.

Although in the example above, the loopback rate is set by the listener (e.g. User B), in another embodiment it is set by the speaker (User A) using user interface 112. It is important to note that the loopback rate may be physically adjusted in the listener's handset, the speaker's handset or in the communications infrastructure 2030. The low processing overhead requirements of the present invention combined with the application of the SOLA technique directly in an audio output buffer while being played enables these different types of deployment.

In the embodiment where the speaker is adjusting the loopback rate, the speaker may realize they have a fast speaking rate and may selectively choose to have their own loopback rate preset to a slower speed.

In addition to manual setting, the present invention provides a syllabic rate or word rate method to set the listeners preferred speaker listening rate. The syllabic rate describes the rate of speech by the number of syllables per unit time as a numeric value. The word rate describes how many words are spoken per unit time. For example, if a listener has a preferred hearing rate of N syllables (words) a minute where N is the number of syllables (words), and the present invention determines the current syllabic (words) rate as X syllables/minute, the present invention employs the time compression/expansion utility to change the speaking rate by a factor of N/X. The listener's preferred speaking rate is stored as a parameter value in the telephone handset as a custom profile for that user. In this embodiment, anyone calling that user will have their loopback rate set to the listener's preferred listening rate.

Conclusions

The present invention permits a user to speed up and slow down speech without changing the speaker's pitch. It is a user adjustable feature to change the spoken rate to the listeners' preferred listening rate or comfort. It can be included on the phone as a customer convenience feature without changing any characteristics of the speakers voice besides the speaking rate with soft key button combinations (in interconnect or normal). From the users perspective, it would seem only that the talker changed his speaking rate, and not that the speech was digitally altered in any way. The pitch and general prosody of the speaker are preserved. The following uses of the time expansion/compression feature are listed to compliment already existing technologies or applications in progress including messaging services, messaging applications and games, real-time feature to slow down the listening rate.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A telephone handset for use in a communications infrastructure, the telephone handset comprising:

an audio input module for receiving audio from a user speaking at an undesired speaking rate;

an audio output module for rendering audio to the user;

an audio loopback path to present audio from the audio input module to the audio output module so as to be heard by the user during a call between the user and another party; and wherein the audio loopback path presents audio at a loopback rate depending upon a selectable rate variable selected by the other party to impose an altered talking rate on the user speaking at the undesired speaking rate.

2. The telephone handset of claim 1, wherein the audio input module receives speech audio from the user at a given speaking rate and wherein the loopback rate alters the speaking rate of the user in the audio loopback path.

3. The telephone handset of claim 2, wherein the speaking rate in the audio loopback path maintains a pitch of the speech audio received in the audio input module.

4. The telephone handset of claim 3, further comprising:

a user interface for selectively adjusting the selectable rate variable.

5. The telephone handset of claim 3, further comprising:

a receiver for receiving, from a second telephone handset, audio and a rate variable set from a second audio handset.

6. The telephone handset of claim 3, wherein the audio loopback path presents audio at a loopback rate through a SOLA (Synchronized OverLap and Add) function.

7. The telephone handset of claim 3, further comprising:

a memory location to store a rate variable for a given user.

8. The telephone handset of claim 3, wherein the audio output module further comprises a vocoder for detecting a word rate in the audio loopback path using:

an energy decision metric;

a voicing decision metric; or a tonality measure.

9. The telephone handset of claim 8, further comprising:

a memory location to store a rate variable and the word rate for a given user.

10. A communication system for adjusting audio rate in a handset comprising:

a first handset for use by a first user;

a second handset for use by a second user, wherein audio captured from the first user at the first handset is presented to the second user at the second handset through a communication infrastructure;

wherein the audio captured from the first user at the first handset is also presented to the first user through a loopback path to an earpiece in the first handset during a call between the first handset and the second handset; and wherein the loopback path includes a loopback rate for speech audio with a selectable rate variable selected by the second user to impose an altered talking rate on the first user when the first user is speaking at an undesired speaking rate.

11. The communication system of claim 10, wherein the first handset includes a user interface for adjusting the selectable rate variable of the first handset.

12. The communication system of claim 11, wherein the first handset includes a memory location for storing the selectable rate variable for association with the second handset.

13. The communication system of claim 10, wherein the second handset includes a memory location for storing the selectable rate variable for association with the first handset.

14. The communication system of claim 10, wherein the second handset includes a user interface for adjusting the selectable rate variable of the first handset.

15. The communication system of claim 10, wherein the first handset includes a vocoder for detecting a word rate detection in the loopback path using:

an energy decision metric;

a voicing decision metric; or a tonality measure.

16. The communication system of claim 15, wherein the first handset includes a memory location for storing the selectable rate variable and the word rate for association with the second handset.

17. A program storage device tangibly embodying a set of programming instructions for executing on a communication unit for causing the communication unit to perform the steps of:

during a call between a user of the communication unit and another party, capturing speech audio from the user of the communication unit in a loopback path between an audio input module and an audio output module, wherein the loopback path presents speech audio received at the audio input module to the audio output module for the user of the communication unit to hear; and when the user of the communication unit is speaking at an undesired speaking rate, adjusting the speech audio from the user of the communication unit captured in the loopback path based upon a selectable rate variable selected by the other party to impose an adjusted speaking rate on the user of the communication unit.

18. The program storage device of claim 17, wherein capturing speech audio includes capturing the speech audio at a given speaking rate and wherein adjusting the speech audio captured includes adjusting the speaking rate in the loopback path.

19. The program storage device of claim 17, wherein adjusting the speech audio captured includes maintaining the pitch of the speech audio.

20. The program storage device of claim 17, wherein adjusting the speech audio captured includes receiving from a user interface an adjustment to the selectable rate variable.

21. The program storage device of claim 17, wherein adjusting the speech audio captured includes receiving from a user interface from a second handset adjustment to the selectable rate variable.

22. The program storage device of claim 17, wherein adjusting the speech audio captured includes adjusting the speech rate through a SOLA (Synchronized OverLap and Add) function.

* * * * *